United States Patent
Zuverink et al.

(10) Patent No.: US 8,683,377 B2
(45) Date of Patent: Mar. 25, 2014

(54) METHOD FOR DYNAMICALLY MODIFYING ZOOM LEVEL TO FACILITATE NAVIGATION ON A GRAPHICAL USER INTERFACE

(75) Inventors: Dave Zuverink, San Jose, CA (US); Scott Amaya, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 476 days.

(21) Appl. No.: 12/778,531

(22) Filed: May 12, 2010

(65) Prior Publication Data

US 2013/0326398 A1     Dec. 5, 2013

(51) Int. Cl.
*G06F 3/048* (2013.01)

(52) U.S. Cl.
USPC .......................... 715/784; 715/786; 715/798

(58) Field of Classification Search
USPC ............... 715/784, 252, 799, 786, 798, 801
See application file for complete search history.

(56) References Cited

U.S. PATENT DOCUMENTS

| | | | | |
|---|---|---|---|---|
| 6,407,749 | B1* | 6/2002 | Duke ........................... | 345/684 |
| 6,747,680 | B1* | 6/2004 | Igarashi et al. ............... | 715/784 |
| 7,568,166 | B2* | 7/2009 | Kato ............................. | 715/784 |
| 7,689,934 | B2* | 3/2010 | Neervoort ..................... | 715/847 |
| 2008/0082939 | A1* | 4/2008 | Nash et al. ..................... | 715/784 |
| 2009/0002335 | A1* | 1/2009 | Chaudhri ....................... | 345/173 |
| 2010/0058226 | A1* | 3/2010 | Flake et al. .................... | 715/786 |
| 2010/0095239 | A1* | 4/2010 | McCommons et al. ...... | 715/784 |

FOREIGN PATENT DOCUMENTS

JP     2010124181 A   *   6/2010

OTHER PUBLICATIONS

Steve Jones et al., "An evaluation of integrated zooming and scrolling on small screens," May 24, 2005, International Journal of Human-Computer Studies, vol. 63, pp. 271-303.*
Andy Cockburn et al., "Improving Scrolling Devices with Document-Length-Dependent Gain," May 2012, ACM CHI '12 Proceedings of the SIGCHI Conference on Human Factors in Computing Systems, pp. 267-276.*

* cited by examiner

*Primary Examiner* — Linh K Pham
*Assistant Examiner* — Andrew T Chiusano
(74) *Attorney, Agent, or Firm* — Kilpatrick Townsend & Stockton LLP

(57) ABSTRACT

Embodiments herein include a scroll manager that provides a mechanism for scrolling that includes automatic zooming or resizing during a scrolling operation. In response to receiving a scroll input, the scroll manager automatically reduces a graphical display size of electronic content to a second graphical display size while simultaneously moving the electronic content across a display area in a given direction. An initial layout of the electronic content is maintained during scrolling operations. By using less vertical space a given page or document containing the content does not need to travel as far vertically on the display screen to display more content. Because the display difference is a shorter linear display distance, this scrolling functionality provides a finer-grained control when scrolling more electronic content. Location during scrolling operations can be identified by visual context, thereby improving scroll navigation efficiency and control.

16 Claims, 5 Drawing Sheets

METHOD FOR DYNAMICALLY MODIFYING ZOOM LEVEL TO FACILITATE NAVIGATION ON A GRAPHICAL USER INTERFACE

BACKGROUND

The present disclosure relates to navigation on graphical user interfaces, including scroll navigation. Graphical user interfaces and display screens can display electronic content, such as text, images, video, etc. Electronic content is often part of a document or other organization of content. The amount of content in a particular document or data structure is frequently more content then can be displayed on a display area of a computing device at one time. To access the additional electronic content that is not currently displayed within the display area (but that is part of the file or document), conventional electronic displays and user interfaces provide access this additional content through various navigation mechanisms.

Such mechanisms can include scrolling, panning, and zooming. Scrolling conventionally refers to the action of moving content, belonging to a document, across a display screen in a given direction. In other words, when scrolling content, a given computing device provides a graphical display that appears as if electronic content is moving from outside of the display area into the display area, then across the display area, and finally moving outside the display area at an opposite side. Scroll bars can be used as input to either move a document up or down along a vertical plane, or side to side along a horizontal plane. Panning refers to a mechanism for "grabbing" or otherwise identifying a reference point within a display area from which to pull or push a document in any direction. Panning is typically manually intensive as panning permits dragging of a document approximately a display screen length and/or width before needing to release an initial reference point and identify a new reference point. Both scrolling and panning enable a different part of a document or web page to be displayed while removing an equal amount of the document out of the display area or out of view. Zooming refers to increasing or decreasing a display size of a document. For example, zooming can double or half a given display size. By "zooming out," more of a particular document can be viewed at one time because the display size of the document is smaller, yet viewing details can become more difficult.

SUMMARY

Conventional navigation techniques suffer from various challenges, especially when viewing electronic content on small screen devices. For example, mobile telephones, tablet devices, personal digital assistants, and other small screen devices have become common tools for viewing electronic content, such as web content, documents, e-mail, news, and so forth. With a smaller screen or relatively small display area, however, less of particular electronic content can be comfortably or legibly viewed at one time. Navigating multiple pages of a document can thus be challenging. Conventional techniques for scroll navigation input on mobile devices or other small screen devices include scrolling with a finger or stylus as a way to "throw," "flick," or "drag" the document, meaning that an operator can make a flicking motion or other quick dragging motion with the finger on a touch screen interface to cause the document content to move across a display, or to otherwise move page contents up or down. Other devices have dedicated buttons for scroll input. To scroll continuously, however, the conventional input mechanism is to provide some type of a scrollbar on a side of a displayed page or graphical user interface. One challenge with conventional scrollbars is the extra screen area occupied on the graphical user interface, which space is more valuable on a small screen or mobile display. Another challenge is balancing scroll speed with context recognition or location identification. For example, having a slow scrolling speed can be frustrating to the user—especially when particular content or a viewed document is relatively large. Slow scrolling speeds can enable more accurate control while content moves across a scrolling page, but requires relatively large amounts of time to scroll through an entire document. Zooming in allows content to be legible, but slows down scrolling speed relative to a length of the document. Thus, having a slow scrolling speed can be frustrating to the user. Conversely, having a fast scrolling speed also results in challenges. For example, scrolling a large document with content passing quickly across a relatively small screen makes it difficult for the user to identify or recognize a current location in the document while scrolling, especially on a small screen. In other words, while content movement is faster, there is little indication of context. With such fast moving content, it is difficult to identify a current location in a given document a user is scrolling across, and a user must rely on guessing to determine when to stop scrolling. With fast scrolling, a user can inadvertently scroll or jump through dozens of pages when only intending to scroll through a few pages of content. In other words, such a scrolling control can be finicky or jumpy.

Techniques disclosed herein provide a mechanism for scrolling that enables automatic zooming or resizing during a scrolling operation. For example, during execution of a scrolling operation, according to embodiments disclosed herein, a display can show a document automatically zoom in and out according to scrolling input. In a more specific example, during scroll navigation of content within a document, a display of the content zooms out, meaning that the graphical display shows pages of the document appearing to shrink or be reduced in size relative to the graphical user interface. By way of a non-limiting example, when the content shrinks in display size, meaning shrinking in geometrical display dimensions of the document or electronic content, each page of the document can appear as a thumbnail view for documents having defined page breaks. By shrinking a display size of the document during scrolling, the document takes up less vertical space on a given display screen. By using less vertical space, a given page or document does not need to travel as far vertically on the display screen to provide navigation from one page to another page. Because the display difference between two pages of a given document is a shorter linear display distance, this scrolling functionality provides a finer-grained control when scrolling electronic content. While the electronic content itself appears smaller during a scrolling operation, a user can still identify a current scroll location within the document based on context, that is, an appearance of content. For example, while individual words or characters may be more difficult to identify while zoomed out, other items are still identifiable. These identifiable items can include chapter headings, images, heading text, paragraph structure, page breaks, outline structure, etc. Thus, by visual context, a viewer can identify a current location within a document during such a scrolling operation, while still being able to scroll through more content per period of time.

Techniques disclosed herein include a scroll manager to execute scrolling functionality. In one embodiment, a scroll manager receives a scroll input to move electronic content in a given direction within a display area of a computing device.

The electronic to be moved is graphically displayed within the display area, and displayed at a first graphical display size. In response to receiving the scroll input, the scroll manager automatically reduces the first graphical display size of the electronic content to a second graphical display size of the electronic content. The scroll manager, simultaneously moves the electronic content across the display area in the given direction. Thus, the scroll manager moves the electronic content across the display area while being displayed at the second graphical display size. This second graphical display size maintains a same electronic content layout as an electronic content layout displayed at the first graphical display size. For example, relative locations of text and images with respect to each other remain the same as initially displayed, with the content itself being displayed at a smaller size. In response to identifying a completion of receiving the scroll input, the scroll manager increases the second graphical display size of the electronic content to the first graphical display size of the electronic content. The scroll manager also stops movement of the electronic content across the display area. Thus, after scrolling is completed, content being displayed at a reduced size returns to an original or initial size. The scroll manager thereby enables fast scrolling while also enabling recognition of a current scroll location by context.

In another embodiment, automatically reducing the first graphical display size of the electronic content to the second graphical display size of the electronic content includes the scroll manager adjusting an amount of reduction based on a total scroll length. This total scroll length refers to a length that content (contained within the document and being partially displayed in the display area) can be moved. In other words, the scroll length includes electronic content that is part of a given displayed document, but not currently appearing in the display area. Adjusting the amount of reduction based on the total scroll length can result in the second graphical display size being smaller for documents that are longer compared to other documents. In an alternative to adjusting reduction based on scroll length, or in conjunction with, the scroll manager can reduce the first graphical display size of the electronic content to the second graphical display size of the electronic content based on a scroll input speed. The scroll manager can optionally prevent reduction of the first graphical display size for documents having a display length less than a predetermined amount.

In some embodiments, a given displayed document might have distinctive page breaks, while other documents might be one continuous page of content. For multi-page documents, the scroll manager can display the electronic content as thumbnail images of pages of a document containing the electronic content. The scroll manager can optionally display the thumbnail images in rows of images.

In other embodiments, the scroll manager can provide dual scrolling functionality by providing a first scroll input interface and a second scroll input interface simultaneously within a graphical user interface that is associated with the electronic content and the display area. With the two scrolling interfaces, in response to receiving scroll input via the first scroll interface, the scroll manager moves the electronic content while simultaneously reducing the first graphical display size. In response to receiving scroll input via the second scroll interface, the scroll manager moves the electronic content without reducing the first graphical display size.

Yet other embodiments herein include software programs to perform the steps and operations summarized above and disclosed in detail below. One such embodiment comprises a computer program product that has a computer-storage medium (e.g., a non-transitory tangible computer readable storage media, disparately located or commonly located storage media, computer storage media or medium, etc.) including computer program logic encoded thereon that, when performed in a computerized device having a processor and corresponding memory, programs the processor to perform the operations disclosed herein. Such arrangements are typically provided as software, firmware, microcode, code data (e.g., data structures), etc., arranged or encoded on a computer readable storage medium such as an optical medium (e.g., CD-ROM), floppy disk, hard disk, one or more ROM or RAM or PROM chips, an Application Specific Integrated Circuit (ASIC), and so on. The software or firmware or other such configurations can be installed onto a computerized device to cause the computerized device to perform the techniques explained herein.

Accordingly, one particular embodiment of the present disclosure is directed to a computer program product that includes one or more computer storage media having instructions stored thereon for supporting operations such as: receiving a scroll input to move electronic content in a given direction within a display area of a computing device, the electronic content being graphically displayed within the display area at a first graphical display size; in response to receiving the scroll input, automatically reducing the first graphical display size of the electronic content to a second graphical display size of the electronic content while simultaneously moving the electronic content across the display area in the given direction, the electronic content being moved across the display area while being displayed at the second graphical display size, the second graphical display size maintaining a same electronic content layout as an electronic content layout displayed at the first graphical display size; and in response to identifying a completion of receiving the scroll input, increasing the second graphical display size of the electronic content to the first graphical display size of the electronic content, and stopping movement of the electronic content across the display area. The instructions, and method as described herein, when carried out by a processor of a respective computer device, cause the processor to perform the methods disclosed herein.

Other embodiments of the present disclosure include software programs to perform any of the method embodiment steps and operations summarized above and disclosed in detail below.

Of course, the order of discussion of the different steps as described herein has been presented for clarity sake. In general, these steps can be performed in any suitable order.

Also, it is to be understood that each of the systems, methods, apparatuses, etc. herein can be embodied strictly as a software program, as a hybrid of software and hardware, or as hardware alone such as within a processor, or within an operating system or within a software application, or via a non-software application such a person performing all or part of the operations. Example embodiments as described herein may be implemented in products and/or software applications such as those manufactured by Adobe Systems Incorporated of San Jose, Calif., USA.

As discussed above, techniques herein are well suited for use in software applications supporting scroll navigation. It should be noted, however, that embodiments herein are not limited to use in such applications and that the techniques discussed herein are well suited for other applications as well.

Additionally, although each of the different features, techniques, configurations, etc. herein may be discussed in different places of this disclosure, it is intended that each of the concepts can be executed independently of each other or in combination with each other. Accordingly, the present invention can be embodied and viewed in many different ways.

Note that this summary section herein does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives of the invention and embodiments, the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to one example embodiment, a scroll manager provides a mechanism for scrolling that enables automatic zooming or resizing during a scrolling operation. For example, during execution of a scrolling operation, according to embodiments disclosed herein, a display can show electronic content automatically zoom in and zoom out according to scrolling input. By shrinking a display size of the electronic content during scrolling, the electronic content takes up less vertical space on a given display screen. By using less vertical space, a given page or document does not need to travel as far vertically on the display screen to provide navigation from one page to another page. Because the display difference between two pages of a given document is a shorter linear display distance or shorter length, this scrolling functionality provides a finer-grained control when scrolling electronic content.

Figure 1:
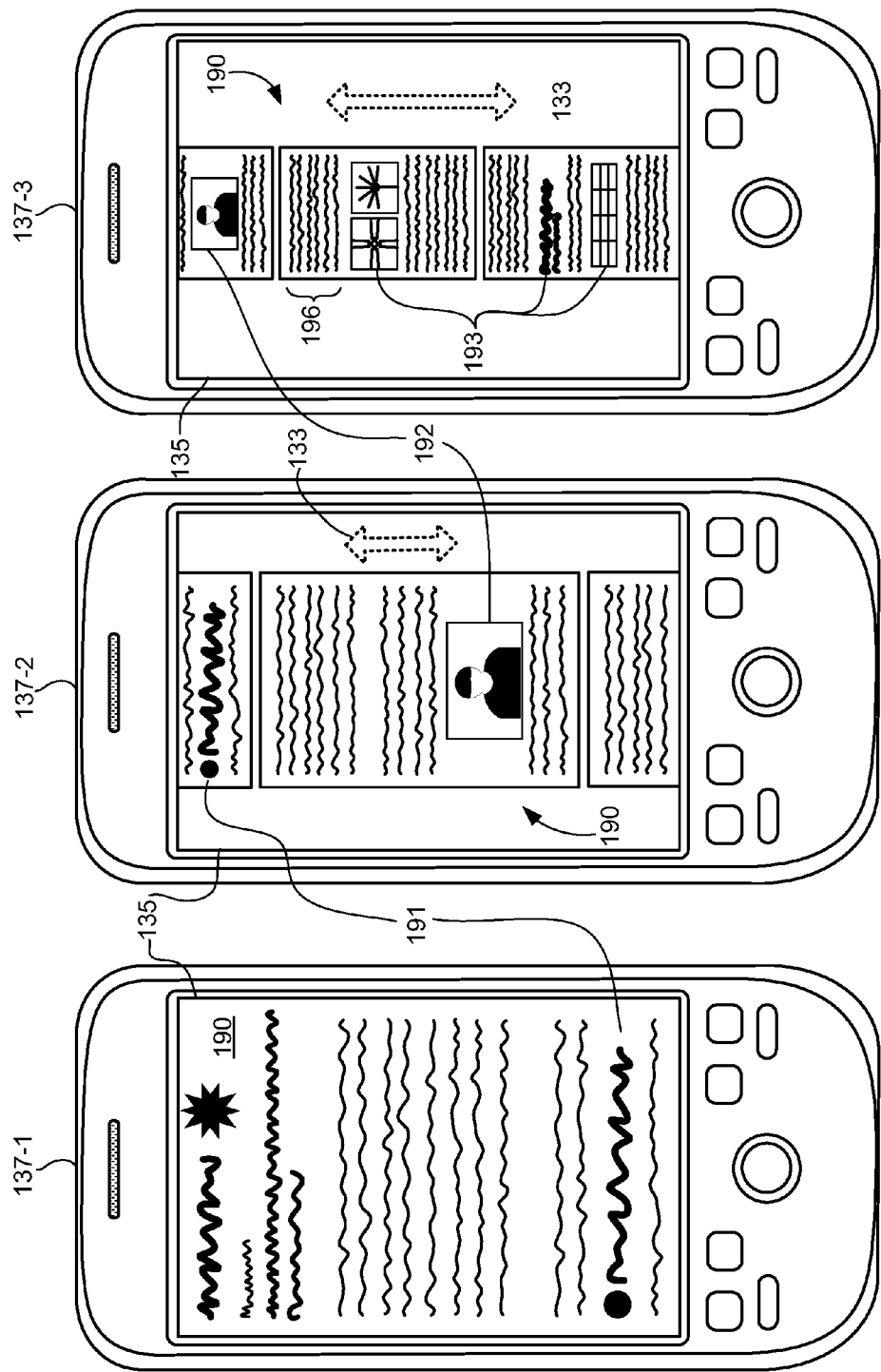
FIG. 1 is an illustration of scroll navigation on a mobile computing device according to embodiments herein.

FIG. 1 illustrates a more specific example according to embodiments herein. FIG. 1 includes mobile computing device 137, which could be embodied as a mobile telephone, wireless computing device, or other computing device having a small screen. Note that embodiments disclosed herein can be used or made for both small screen and large screen devices.

Embodiments disclosed herein are particularly useful for computing devices having a relatively small screen, such as on mobile telephones, personal digital assistants, or other display screens or user interfaces having a limited vertical display distance. Embodiments disclosed herein are also particularly useful for computing devices having a display screen with touch screen functionality, touch screens do not always provide as high a level of input control as do computing devices having peripheral input devices. Nevertheless, embodiments herein can be useful for computing devices with relatively larger display screens such as desktop computers, tablet computers, and laptops. Thus, while the scroll manager can provide advantages and improved navigation with all screen sizes and types, certain embodiments can have particular utility and benefit when used with a computing device having a relatively small display screen.

Computing device 137 is further identified as computing device 137-1, 137-2, and 137-3. Each of these three views of computing device 137 illustrates a different graphical display within display area 135, according to an example scroll operation.

A scroll manager application and process can function to receive input and control scroll navigation for computing device 137, or other display. For convenience, the scroll manager will be identified as scroll manager 140, and will be further explained throughout the description and in FIG. 1. Scroll manager 140 can provide a user interface which can overlap or be overlaid on a given display of electronic content as a mechanism for providing and activating a scrollbar or scrolling functionality. Scroll manager 140 can receive input via a peripheral device, fixed button, touch screen interface, or any other scroll input mechanism. Scroll manager 140 can optionally display a scrolling interface (such as a scroll bar), or can execute without any graphical display to indicate available navigation functionality.

More specifically, computing device 137-1 illustrates a view of electronic content within a single page of multi-page document 190. Visible on this page is heading text, body text and additional heading text 191. Upon initiation of a scroll operation, such as while receiving a scroll input, the scroll manager 140 displays document 190 at a zoomed out view, meaning that the graphical display shows pages of document 190 appearing to shrink or be reduced in size relative to the display area 135.

Computing device 137-2 illustrates this reduction in display size. Within display area 135 of computing device 137-2, a display of document 190 appears to have been reduced in size so that approximately two pages of document 190 can fit within a vertical display axis of display area 135. Note that heading 191 is still recognizable. Arrow 133 may or may not be displayed, but is shown here to indicate that computing device 137-2 is currently receiving a scrolling input, such as by a finger moving along the vertical axis of display area 135. Now that document 190 has been reduced in display size, it is possible to view other layout or structural aspects within document 190, such as image 192.

Computing device 137-3 illustrates continued reduction in display size of document 190, and movement of document 190. For example, a display of document 190 has been further reduced in size (compared to that in computing device 137-2) to a point where almost three page lengths of document 190 are visible within display area 135 of computing device 137-3. Movement is visible by examining a new location of image 192 compared to a location of image 192 within display area 135 on computing device 137-2. An additional size reduction is also visible by visual comparison between displayed electronic content on computing devices 137-2 and 137-3. Within display area 135 of computing device 137-3, given lines of text 196 are now more difficult to identify or read, but identification of a current location within document 190 is readily possible by examining graphical context provided by additional images, heading text, and tables 193. Such identifiable items can include chapter headings, images, heading text, paragraph structure, page breaks, outline structure, etc. Thus, by visual context, a viewer can identify a current location within document 190 during such a scrolling operation, while still being able to scroll through more electronic content within a given time frame. When a viewer is familiar with a document, or document structure or patterns within the document, navigation by context is easier, even if much of the electronic content is not specifically recognizable, such as with individual words.

Functionality supported by scroll manager 140 will now be discussed via flowcharts and illustrations in FIG. 2 through FIG. 5. For purposes of the following discussion, the scroll manager 140 or other appropriate entity performs steps in the flowcharts.

Figure 2:
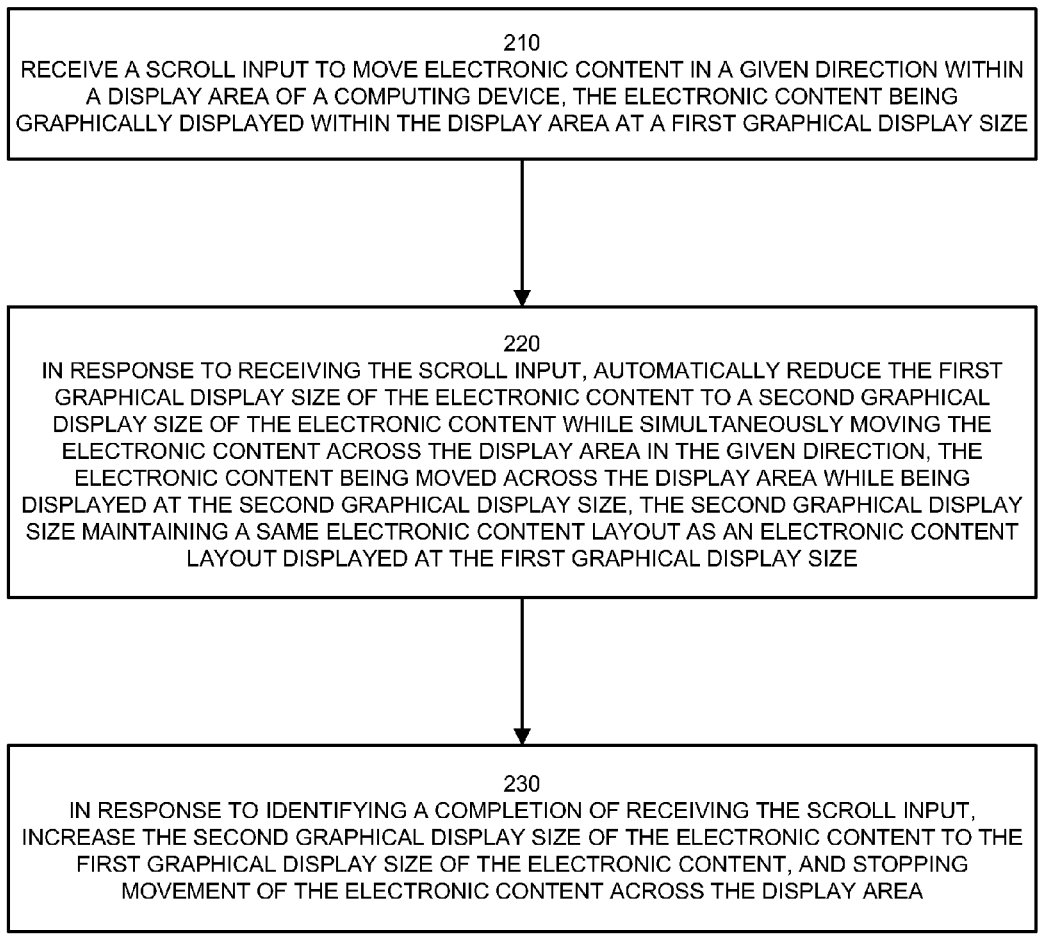
FIG. 2 is a flowchart illustrating an example of a process supporting a scroll manager according to embodiments herein.

Now describing embodiments more specifically, FIG. 2 is a flow chart illustrating embodiments disclosed herein. In step 210, scroll manager 140 receives a scroll input to move electronic content in a given direction within a display area of a computing device 137. By way of a non-limiting example, this input can be a dragging or flicking motion of a finger or stylus, a button input, a cursor input from a mouse, etc. Electronic content refers to any content that can be electronically stored and then electronically displayed. Electronic content includes, for example, text, characters, images, symbols, video, and so forth. The electronic content is graphically displayed within the display area 135 at a first graphical display size. For example, this first graphical display size can be considered as an initial or original display size, or any given size for viewing the electronic content, depending on individual viewing preferences. Note that a graphical display size of electronic content is distinct from a size of display area 135. Display area 135 typically maintains a same area and/or resolution, while electronic content appearing within display area 135 can change in display size.

In step 220, scroll manager 140, in response to receiving the scroll input, automatically reduces the first graphical display size of the electronic content to a second graphical display size of the electronic content while simultaneously moving the electronic content across the display area 135 in the given direction. The scroll manager 140 can first reduce the display size and then begin movement, or begin moving the electronic content and during this movement dynamically reduce a display size of the content, or can alternatively move electronic content and reduce display size at a same time. Scrolling functionality includes the electronic content being moved across the display area while being displayed at the second graphical display size. This second graphical display size maintains a same electronic content layout as an electronic content layout displayed at the first graphical display size. In other words, a display arrangement of the content maintains this arrangement relative to the electronic content itself. By way of a more specific, non-limiting example, if the electronic content were re-flowable content, such as HTML (HyperText Markup Language), then scroll manager 140 would prevent reflowing of HTML content by either reducing HTML display margins along reducing with text/image size, or execute another mechanism to prevent reflowing of HTML content.

In step 230, in response to identifying a completion of receiving the scroll input, scroll manager 140 increases the second graphical display size of the electronic content to the first graphical display size of the electronic content, and stops movement of the electronic content across the display area 135. Identifying a completion can include various indicators, such as removal of a stylus or finger from a touch screen, or releasing of a mouse button, or expiration of a predetermined time interval without receiving additional or continued scroll input. In some embodiments, a reduced display of electronic content can remain at a reduced size until receiving a manual input to return to an initial size, such as by receiving a selection of a given location of the electronic content. Thus, returning to an initial display size can be either manual or automatic.

Figure 3:
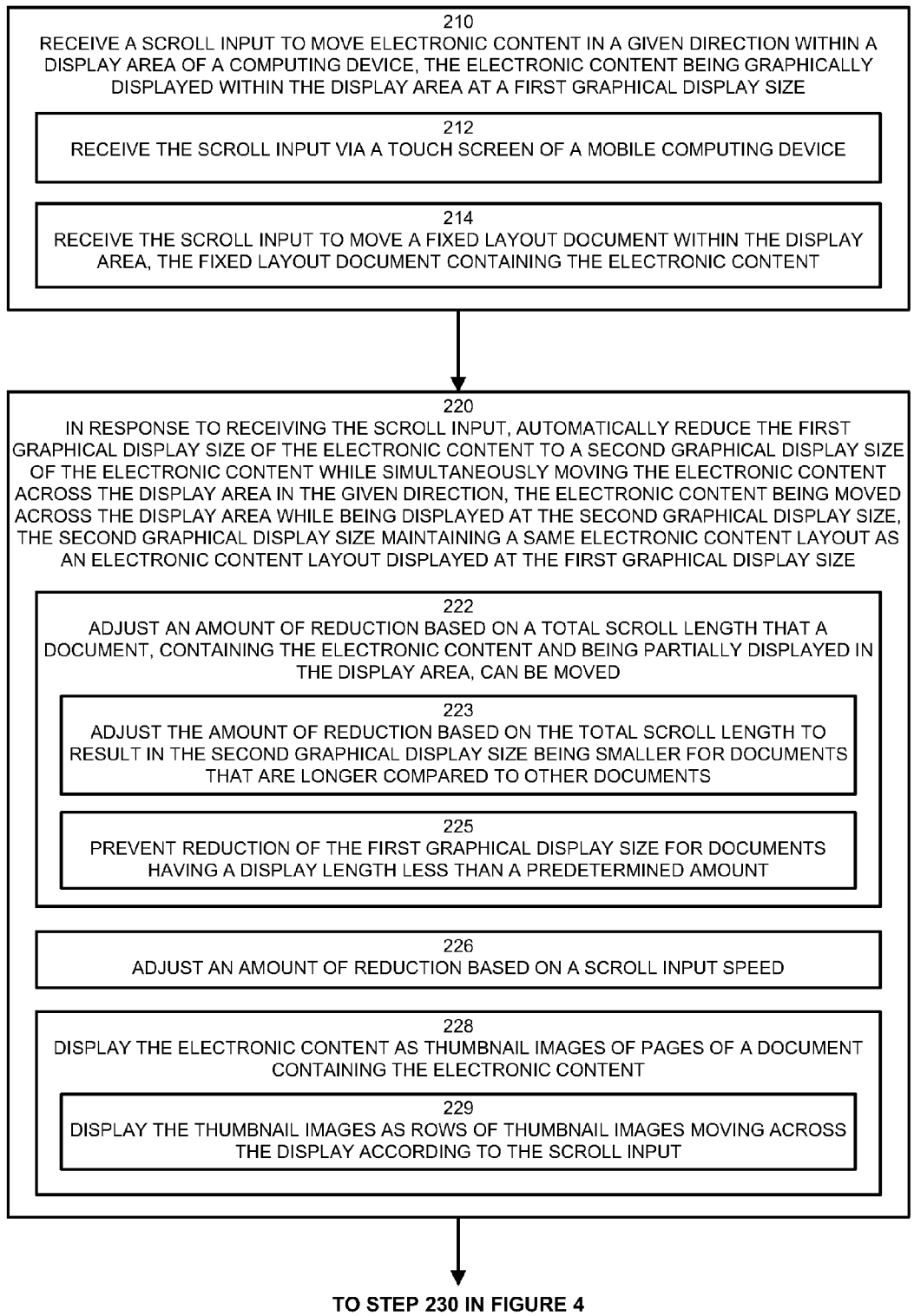
FIGS. 3-4 are a flowchart illustrating an example of a process supporting a scroll manager according to embodiments herein.
Figure 4:
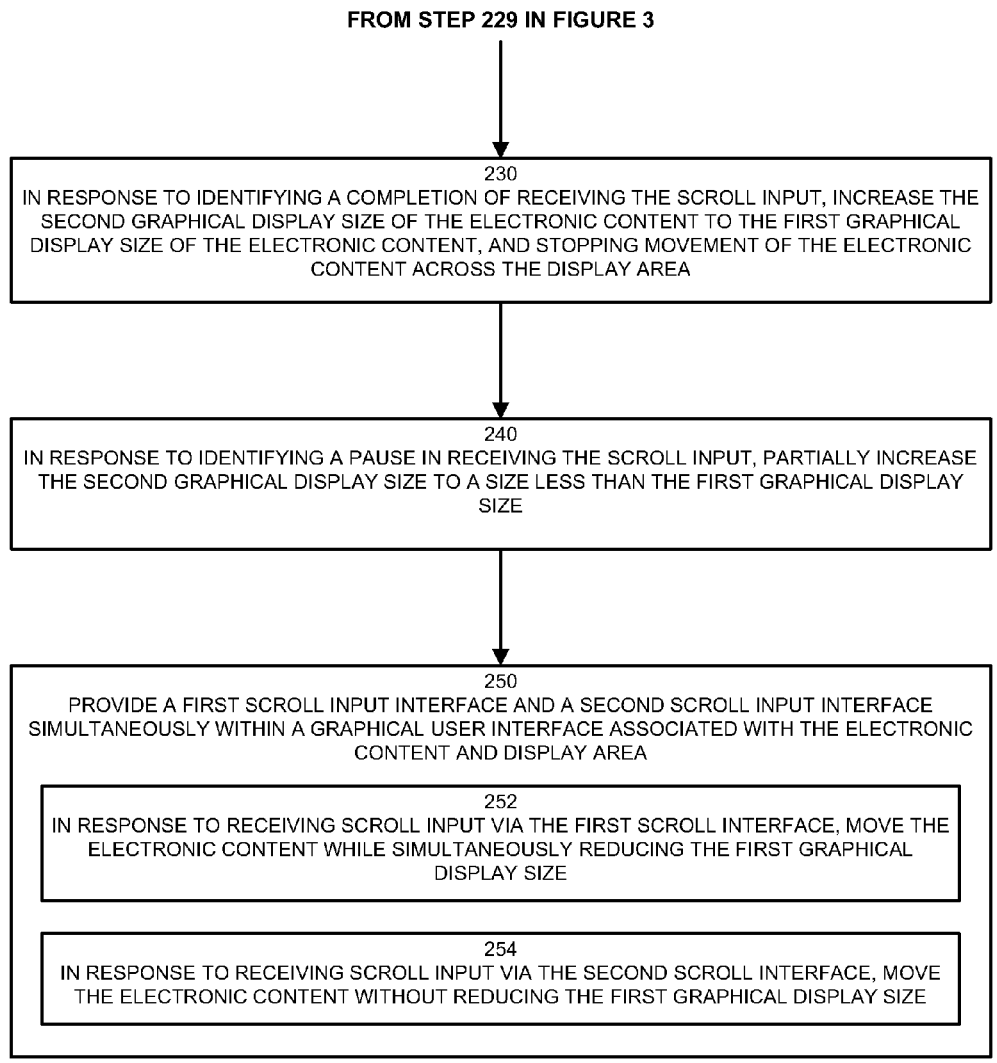

FIGS. 3-4 include a flow chart illustrating additional and/or alternative embodiments and optional functionality as disclosed herein.

In step 210, scroll manager 140 receives a scroll input to move electronic content in a given direction within display area 135 of a computing device 137. The electronic content is graphically displayed within the display area 135 at a first graphical display size.

In step 212, scroll manager 140 receives the scroll input via a touch screen of a mobile computing device 137. For example, many computing devices have display screens that can detect the presence, location, and movement of touch on the display screen itself. Such embodiments may not display a visible scroll bar or scroll indicator, but scroll manager 140 can nevertheless provide scroll functionality in response to receiving such input.

In step 214, scroll manager 140 receives the scroll input to move a fixed layout document within the display area 135. The fixed layout document contains the electronic content. For example, word processing documents typically include a layout that does not reflow when resized, or when changing a zoom level. Another common type of document is a PDF (portable document format) file, which is typically structured as a fixed two-dimensional layout of electronic content.

In step 220, scroll manager 140, in response to receiving the scroll input, automatically reduces the first graphical display size of the electronic content to a second graphical display size of the electronic content. Scroll manager 140 resizes this electronic content while simultaneously moving the electronic content across the display area 135 in the given direction. Scroll manager 140 moves the electronic content across the display area 135 while being displayed at the second graphical display size. The second graphical display size maintains a same electronic content layout as an electronic content layout displayed at the first graphical display size.

In step 222, scroll manager 140 adjusts an amount of reduction based on a total scroll length that a document (containing the electronic content and being partially displayed in the display area 135) can be moved. Computing device 137 displaying electronic content from a given document, group of electronic content, or other data structure, cannot always display the entire contents of the given document within display area 135. Documents in general can range in size from one or two pages, to tens, hundreds, or thousands of pages. Depending on the amount of electronic content and a length of display area 135, the total scroll length of electronic content could span just a few screen lengths to many screen lengths.

In step 223, scroll manager 140 adjusts the amount of reduction based on the total scroll length to result in the second graphical display size of electronic content being smaller for documents that are longer compared to other documents. By way of a non-limiting example, if a given document were four pages long, or, alternatively, the length of four vertical display areas, then scroll manager 140 can reduce a display size by 25%, which percentage is arbitrary for this example. If a second given document being displayed were fifty pages long, or fifty screen lengths, then scroll manager 140 might reduce the display size by 75%, resulting in the electronic content being displayed at an even smaller display size for relatively larger documents.

In step 225, scroll manager 140 prevents reduction of the first graphical display size for documents having a display length less than a predetermined amount. For example, scroll manager 140 can include an optional setting for preventing automatic dynamic zooming when scrolling content less than a set amount or length, such as three screen lengths. For such electronic content having a short scroll length, scrolling through the entire content is relatively quick, even at slow scroll speeds, and thus the accompanying dynamic zoom might not be as useful as with longer documents.

In step 226, scroll manager 140 adjusts an amount of reduction based on a scroll input speed. In addition to, or in place of, reduction based on scroll length, scroll manager 140 can also dynamically adjust an amount of reduction based on an input speed. For example, in the context of touch screen scrolling, scroll manager 140 can function such that identifying a relatively slow dragging motion across a touch screen results a reduction size of about 25%, while identifying a quick dragging motion or flicking action on the touch screen can result in reducing the display size by 50% or 75% or other configurable value.

In other words, a zooming amount can be based on a scrolling speed or scrolling input speed. A user dragging a finger slowly across a screen causes scrolling with a relatively small amount of corresponding zooming of displayed content, while dragging a finger quickly across a scroll area causes automatic zooming to zoom at a higher level by showing smaller thumbnails or smaller representations of pages within the document. Typically, a faster scrolling input might indicate a user's desire to scroll through many pages quickly versus scrolling through just a few pages. Thus, by increasing the zoom level according to scroll input, navigation becomes easier for a user to quickly and efficiently scroll through many pages of electronic content.

In step 228, scroll manager 140 displays the electronic content as thumbnail images of pages of a document containing the electronic content. Certain documents include well defined page breaks, and thus reducing a display size of pages of such documents can result in the pages appearing similar to thumbnail images, or a smaller image representation of the larger page.

In step 229, scroll manager 140 displays the thumbnail images as rows of thumbnail images moving across the display area 135 according to the scroll input. As an alternative embodiment, scroll manager 140 can display reduced size pages as a single line of pages, or as rows of thumbnail images moving across display area 135. For example, instead of one string of pages moving at a time, several columns of page images can be moving across display area 135. Receiving a selection of any of these thumbnail size pages can return the selected page to an initial graphical display size of electronic content. A number of thumbnail images displayed per row can be manually configured, automatically set, or based on document scroll length and/or scroll input speed.

In step 230, scroll manager 140, in response to identifying a completion of receiving the scroll input, increases the second graphical display size of the electronic content to the first graphical display size of the electronic content, and stops movement of the electronic content across the display area 135.

In step 240, scroll manager 140, in response to identifying a pause in receiving the scroll input, partially increases the second graphical display size to a size less than the first graphical display size. For example, a given user can be flicking through the electronic content at a relatively quick speed, causing scroll manager 140 to reduce page display size by about 50%. The given user may momentarily cease flicking or dragging the electronic content. In response to this pause in scrolling input, scroll manager 140 can increase display size by 25%, with the electronic content remaining at this intermediate size until receiving additional scrolling input. With additional scrolling input, the scroll manager 140 can either continue to reduce display size, or the scrolling input can instruct to return the electronic content to an initial display size, such as after identifying a tapping action on a touch screen or identifying clicking within the displayed electronic content. Alternatively, after the scroll manager 140 increases the electronic content to the intermediate size, if scroll manager 140 receives no additional scroll input within a predetermined time frame, then scroll manager 140 can return the electronic content to the initial display size.

In step 250, scroll manager 140 provides a first scroll input interface and a second scroll input interface simultaneously within a graphical user interface associated with the electronic content and display area. For example, scroll manager 140 can display two types of scroll bars. In another example, a touch screen can configure a center/middle vertical area of the screen as a first interface, and a side vertical area as the second interface. Alternatively, separate buttons can be designated for each type of scroll input.

In step 252, in response to receiving scroll input via the first scroll interface, scroll manager 140 moves the electronic content while simultaneously reducing the first graphical display size. In step 254, and in response to receiving scroll input via the second scroll interface, scroll manager 140 moves the electronic content without reducing the first graphical display size. In other words, one scroll input area or interface can provide automatic dynamic zooming with scrolling movement, while another scroll input area or interface provides conventional scrolling, that is, without simultaneous automatic.

In other embodiments, scroll manager 140 can set maximum reduction size, which can correspond to a minimum thumbnail size for document pages. Reducing electronic content displayed below a certain threshold or resolution can make a content display size too small to identify by context.

In another embodiment, scroll manager 140 can be configured to provide dynamic functionality for multi directional scrolling, such as with a displayed map or graphical image.

For embodiments that provide scroll functionality for re-flowable content, HTML, web content, etc., scroll manager 140 prevents reflow. Typically, zooming of a web content within a web page causes re-flowing of content. For example, in the case of textual content, reducing a display size can result in more words or characters displayed per line. Such reflowing modifies or changes an initial layout or content pattern, which can increase difficulty in identifying a navigation location by context. For re-flowable content, the scroll manager 140 can dynamically adjusts display margins within display area 135 while zooming out to prevent such content from reflowing in response reducing content size, or scroll manager 140 can otherwise preventing the re-flowable content from re-flowing, so as not to confuse an operator during a scrolling operation. In other words the scrolling manager maintains an HTML layout during the zooming operations.

Techniques disclosed herein are also particularly useful for PDF files and reflowed PDF files. One common PDF file size is Letter size (8.5 inches by 11 inches). Another common page size is A4, which has similar dimensions to Letter size. While a Letter size document can be comfortably viewed from relatively lager display screens, such as desktop computer displays, such Letter size documents are difficult to view on mobile displays and small screens because both vertical and horizontal scrolling is typically necessary. Certain techniques created by Adobe Systems Incorporated enable reflowing of PDF content to a size that better fits mobile display screens.

Such reflowing, however, can convert one page of a Letter size document to the equivalent of about ten pages sized for a mobile computing device, which increases the need for vertical scrolling. Scroll manager 140 can thus provide for easier scrolling of reflowed PDF files using the automatic zoom scrolling functionality is described herein.

In another embodiment, page numbering can be displayed within display area 135, but displayed separate from the electronic content as an additional mechanism to help a given display view maintain context during fast scrolling operations.

Figure 5:
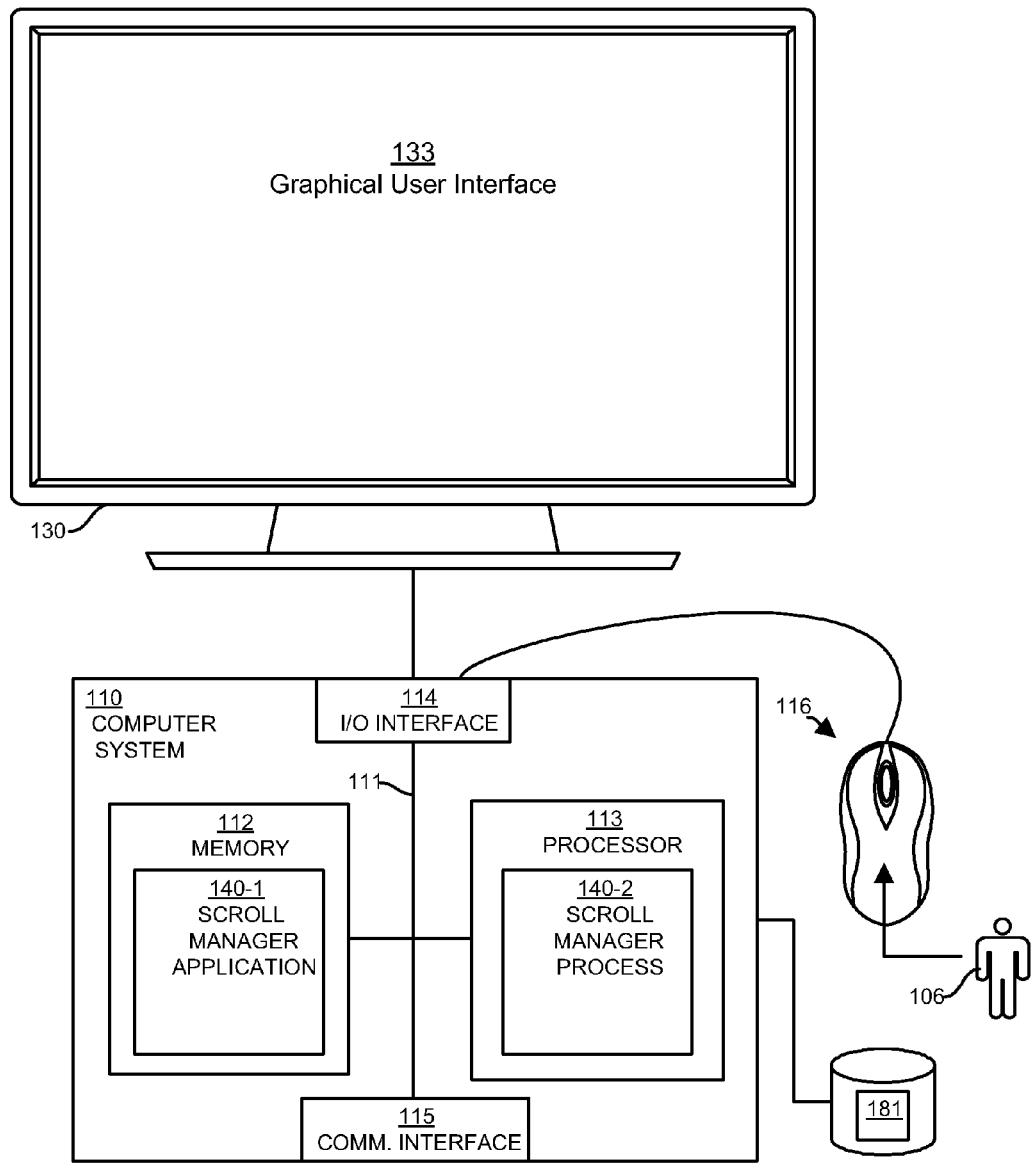
FIG. 5 is an example block diagram of a scroll manager operating in a computer/network environment according to embodiments herein.

Now more particularly, FIG. 5 shows an example physical embodiment of the scroll manager 140. This subsequent description will explain the flow charts and will reference illustrations in the figure to describe additional example embodiments.

In FIG. 5, computer system 110 is shown connected to display monitor 130 for displaying a graphical user interface 133 for a user 106 to use a scroll manager 140 for scroll navigation, using input devices 116. In some embodiments, computer system 110 can execute scroll manager 140 independent of user input, or in response to various inputs. Repository 181 can optionally be used for storing data both before and after processing. Input devices 116 can include one or more devices such as a keyboard, computer mouse, etc.

Note that the following discussion provides a basic embodiment indicating how to carry out functionality associated with the scroll manager 140 as discussed above and below. It should be noted, however, that the actual configuration for carrying out the scroll manager 140 can vary depending on a respective application. For example, as previously discussed, computer system 110 can include one or multiple computers that carry out the processing as described herein.

In different embodiments, computer system 110 may be any of various types of devices, including, but not limited to, a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, or in general any type of computing or electronic device.

As shown, computer system 110 of the present example includes an interconnect 111 that couples a memory system 112, a processor 113, I/O interface 114, and a communications interface 115.

I/O interface 114 provides connectivity to peripheral devices such as input devices 116 including a computer mouse, a keyboard, a selection tool to move a cursor, display screen, etc.

Communications interface 115 enables the scroll manager 140 of computer system 110 to communicate over a network and, if necessary, retrieve any data required to create views, process content, communicate with a user, etc. according to embodiments herein.

As shown, memory system 112 is encoded with scroll manager 140-1 that supports functionality as discussed above and as discussed further below. Scroll manager 140-1 (and/or other resources as described herein) can be embodied as software code such as data and/or logic instructions that support processing functionality according to different embodiments described herein.

During operation of one embodiment, processor 113 accesses memory system 112 via the use of interconnect 111 in order to launch, run, execute, interpret or otherwise perform the logic instructions of the scroll manager 140-1. Execution of the scroll manager 140-1 produces processing functionality in scroll manager process 140-2. In other words, the scroll manager process 140-2 represents one or more portions of the scroll manager 140 performing within or upon the processor 113 in the computer system 110.

It should be noted that, in addition to the scroll manager process 140-2 that carries out method operations as discussed herein, other embodiments herein include the scroll manager 140-1 itself (i.e., the un-executed or non-performing logic instructions and/or data). The scroll manager 140-1 may be stored on a tangible non-transitory computer readable storage medium including computer readable storage media such as floppy disk, hard disk, optical medium, etc. According to other embodiments, the scroll manager 140-1 can also be stored in a memory type system such as in firmware, read only memory (ROM), or, as in this example, as executable code within the memory system 112.

In addition to these embodiments, it should also be noted that other embodiments herein include the execution of the scroll manager 140-1 in processor 113 as the scroll manager process 140-2. Thus, those skilled in the art will understand that the computer system 110 can include other processes and/or software and hardware components, such as an operating system that controls allocation and use of hardware resources, or multiple processors.

Those skilled in the art will understand that there can be many variations made to the operations of the user interface explained above while still achieving the same objectives of the invention. Such variations are intended to be covered by the scope of this invention. As such, the foregoing description of embodiments of the invention are not intended to be limiting. Rather, any limitations to embodiments of the invention are presented in the following claims.

The invention claimed is:

1. A computer-implemented method comprising:
  receiving a scroll input to move electronic content, the electronic content being graphically displayed within a display area at a first graphical display size;
  in response to receiving the scroll input, determining a reduction amount to apply to the first graphical display size based at least in part on a total scroll length that a document, containing the electronic content and being partially displayed in the display area, can be moved, wherein the determined reduction amount applied to the first graphical display size results in the electronic content being graphically displayed within the display area at a second graphical display size, the second graphical size being smaller for documents having a longer total scroll length than for documents having a comparatively shorter total scroll length;
  based at least in part on the determination of the reduction amount, partially displaying the electronic content while simultaneously moving the electronic content across the display area, the electronic content being moved across the display area while being displayed at the second graphical display size; and
  in response to identifying a completion of receiving the scroll input, increasing the second graphical display size of the electronic content to the first graphical display size of the electronic content, and stopping movement of the electronic content across the display area.

2. The computer-implemented method of claim 1, further comprising preventing reduction of the first graphical display size for documents having a display length less than a predetermined amount.

3. The computer-implemented method of claim 1, wherein automatically reducing the first graphical display size of the electronic content to the second graphical display size of the electronic content includes adjusting an amount of reduction based on a scroll input speed.

4. The computer-implemented method of claim 1, wherein moving the electronic content across the display area includes displaying the electronic content as thumbnail images of pages of a document containing the electronic content.

5. The computer-implemented method of claim 4, further comprising displaying the thumbnail images as rows of thumbnail images moving across the display area according to the scroll input.

6. The computer-implemented method of claim 1, wherein receiving the scroll input includes receiving the scroll input via a touch screen of a mobile computing device.

7. The computer-implemented method of claim 1, wherein receiving the scroll input to move electronic content includes receiving the scroll input to move a fixed layout document within the display area, the fixed layout document containing the electronic content.

8. The computer-implemented method of claim 1, further comprising: in response to identifying a pause in receiving the scroll input, partially increasing the second graphical display size to a size less than the first graphical display size.

9. The computer-implemented method of claim 1, further comprising:
providing a first scroll input interface and a second scroll input interface simultaneously within a graphical user interface associated with the electronic content and display area;
wherein receiving scroll input via the first scroll interface results in moving the electronic content while simultaneously reducing the first graphical display size; and
wherein receiving scroll input via the second scroll interface results in moving the electronic content without reducing the first graphical display size.

10. A computer program product including a non-transitory computer-storage medium having instructions stored thereon for processing data information, such that the instructions, when carried out by a processing device, cause the processing device to perform the operations of:
in response to receiving scroll input, determining a reduction amount to apply to a first graphical display size based at least in part on a total scroll length that a document, containing electronic content and being partially displayed in a display area, can be moved, wherein the determined reduction amount applied to the first graphical display size results in the electronic content being graphically displayed within the display area at a second graphical display size, the second graphical size being smaller for documents having a longer total scroll length than for documents having a comparatively shorter total scroll length;
based at least in part on the determination of the reduction amount, partially displaying the electronic content while simultaneously moving the electronic content across the display area in a given direction, the electronic content being moved across the display area while being displayed at the second graphical display size; and
in response to identifying a completion of receiving the scroll input, increasing the second graphical display size of the electronic content to the first graphical display size of the electronic content, and stopping movement of the electronic content across the display area.

11. The computer program product of claim 10, further comprising preventing reduction of the first graphical display size for documents having a display length less than a predetermined amount.

12. The computer program product of claim 10, wherein automatically reducing the first graphical display size of the electronic content to the second graphical display size of the electronic content includes adjusting an amount of reduction based on a scroll input speed.

13. The computer program product of claim 12, wherein moving the electronic content across the display area includes displaying the electronic content as thumbnail images of pages of a document containing the electronic content.

14. The computer program product of claim 13, further comprising displaying the thumbnail images as rows of thumbnail images moving across the display according to the scroll input.

15. The computer program product of claim 10, wherein receiving the scroll input includes receiving the scroll input via a touch screen of a mobile computing device.

16. A computer system comprising:
a processor; and
a memory coupled to the processor, the memory storing instructions that when executed by the processor cause the system to perform the operations of:
in response to receiving scroll input, determining a reduction amount to apply to a first graphical display size based at least in part on a total scroll length that a document, containing electronic content and being partially displayed in a display area, can be moved, wherein the determined reduction amount applied to the first graphical display size results in the electronic content being graphically displayed within the display area at a second graphical display size, the second graphical size being smaller for documents having a longer total scroll length than for documents having a comparatively shorter total scroll length;
based at least in part on the determination of the reduction amount, partially displaying the electronic content while simultaneously moving the electronic content across the display area in a given direction, the electronic content being moved across the display area while being displayed at the second graphical display size; and
in response to identifying a completion of receiving the scroll input, increasing the second graphical display size of the electronic content to the first graphical display size of the electronic content, and stopping movement of the electronic content across the display area.

* * * * *